(12) United States Patent  
Barclay et al.

(10) Patent No.: US 11,677,350 B2  
(45) Date of Patent: Jun. 13, 2023

(54) SOLAR PANEL TILT ADJUSTMENT SYSTEM

(71) Applicants: Randy Barclay, Livermore, CA (US); Samuel Anthony Dottle, Sonora, CA (US)

(72) Inventors: Randy Barclay, Livermore, CA (US); Samuel Anthony Dottle, Sonora, CA (US)

(*) Notice: Subject to any disclaimer, the term of this patent is extended or adjusted under 35 U.S.C. 154(b) by 0 days.

(21) Appl. No.: 17/128,007

(22) Filed: Dec. 19, 2020

(65) Prior Publication Data

US 2021/0194414 A1    Jun. 24, 2021

Related U.S. Application Data

(60) Provisional application No. 62/951,233, filed on Dec. 20, 2019.

(51) Int. Cl.
| | |
|---|---|
| *H01L 31/042* | (2014.01) |
| *H02S 10/00* | (2014.01) |
| *H02S 40/20* | (2014.01) |
| *H02S 40/42* | (2014.01) |
| *H02S 20/32* | (2014.01) |
| *H02S 10/40* | (2014.01) |
| *B60R 11/00* | (2006.01) |

(52) U.S. Cl.
CPC ............ *H02S 20/32* (2014.12); *B60R 11/00* (2013.01); *H02S 10/40* (2014.12)

(58) Field of Classification Search
CPC ........... H02S 20/32; H02S 10/40; H02S 20/30
See application file for complete search history.

(56) References Cited

U.S. PATENT DOCUMENTS

| | | | |
|---|---|---|---|
| 5,833,305 | A  | 11/1998 | Watzlawick et al. |
| 6,669,278 | B2 | 12/2003 | Patelczyk et al. |
| 7,445,275 | B2 | 11/2008 | Woodhouse et al. |
| 8,469,022 | B2 |  6/2013 | Cowan et al. |
| 8,720,125 | B2 |  5/2014 | Andretich |
| 8,742,307 | B2 |  6/2014 | Noglotte |
| 9,490,384 | B1 | 11/2016 | Strahm |
| 9,718,334 | B2 |  8/2017 | Means |
| 9,784,476 | B2 | 10/2017 | Stein |

(Continued)

FOREIGN PATENT DOCUMENTS

| | | |
|---|---|---|
| CN | 205721387 U | 11/2016 |
| CN | 207466384 U |  6/2018 |

(Continued)

*Primary Examiner* — Angelo Trivisonno  
(74) *Attorney, Agent, or Firm* — Stetina Brunda Garred & Brucker

(57) ABSTRACT

A tilt adjustment system for a solar panel mountable to a vehicle surface has a first panel bracket defined by an upper flat section and a lower flat section. A first lift jack has a jacking head mounted to the upper flat section and a foot mountable to the vehicle surface. An upper face of the solar panel is positioned below a plane of the upper flat section of the first panel bracket. A second panel bracket is defined by an upper flat section and a lower flat section. A second lift jack has a jacking head mounted to the upper flat section and a foot mountable to the vehicle surface. The upper face of the solar panel is positioned below a plane of the upper flat section of the second panel bracket.

9 Claims, 8 Drawing Sheets

(56) References Cited

U.S. PATENT DOCUMENTS

| | | |
|---|---|---|
| 10,148,219 B2 | 12/2018 | Sun et al. |
| 2011/0023864 A1 | 2/2011 | Andretich |
| 2015/0013750 A1* | 1/2015 | Meppelink .............. H02S 20/30 |
| | | 211/164 |
| 2017/0063290 A1 | 3/2017 | Kurlagunda et al. |
| 2019/0181796 A1 | 6/2019 | Kim |

FOREIGN PATENT DOCUMENTS

| | | |
|---|---|---|
| CN | 207977932 U | 10/2018 |
| GB | 2240517 A | 8/1991 |

\* cited by examiner

SOLAR PANEL TILT ADJUSTMENT SYSTEM

CROSS-REFERENCE TO RELATED APPLICATIONS

This application relates to and claims the benefit of U.S. Provisional Application No. 62/951,233 filed Dec. 20, 2019 and entitled "SOLAR PANEL TILT ADJUSTMENT SYSTEM" the disclosure of which is wholly incorporated by reference in its entirety herein.

STATEMENT RE: FEDERALLY SPONSORED RESEARCH/DEVELOPMENT

Not Applicable

BACKGROUND

1. Technical Field

The present disclosure relates generally to solar panels and vehicle installations thereof, and more particularly, to a remote control solar panel tilt adjustment system.

2. Related Art

While the population of the United States is largely clustered around major metropolitan areas that offer modern comforts such as electrical power, running water, gas, and sewage systems, many still heed the call of the great outdoors to explore and seek adventures in the most remote areas of the country. Because of the construction of state and interstate highways, mobility of the American public increased over the past century, and the popularity of recreational vehicles (RVs) likewise expanded.

In its basic form, an RV is a vehicle with living quarters for temporary accommodation, though it may refer to vehicles ranging from motorhomes, campervans, travel trailers/camper trailers, fifth wheel trailers, and popup campers. There may be dedicated sleeping quarters, a kitchen, and a bathroom, as well as conveniences such as heating and air conditioning, water heaters, refrigerators, and microwave ovens. The more luxurious RVs may be equipped with television sets, video game consoles, and the like.

Although some RVs are utilized as a primary home, most are used when travelling to destinations of interest. There are thousands of public campgrounds across local, state, and national parks, and while many of these campgrounds offer water and electrical hookups to run the aforementioned appliances, campsites at the more remote locations do not. To this end, many owners install solar panels (or photovoltaic cells) on the RV, along with batteries that store the electrical energy converted from the captured solar energy by the photovoltaic cells during daylight hours.

Beyond recreational vehicle use, solar panels are also commonly installed on tractor trailers and other commercial or industrial vehicles, as power may be needed to operate autonomous systems, refrigeration or heating control systems, and the like.

The solar panels are typically mounted to the roof of the vehicle to maximize exposure to the sun, and to directly face the incoming solar rays for the most effective and efficient generation of electricity. In the early morning or the late afternoon, or during winter months, the sun may not be directly overhead and is relatively low on the horizon. So that maximum energy capture is possible, the solar panel may be tilted or angled toward the sun. Conventionally, the user climbs on to the roof and manually adjusts the orientation of the solar panel, but this is undesirable because of the risk of falling and of damaging the roof and/or other equipment installed thereon. Furthermore, with the position of the sun constantly moving throughout the day, the adjustment process may be time consuming. Thus, motorized mount mechanisms have been developed, which moves the solar panel to track the position of the sun throughout the day. These systems typically include remote controllers to eliminate the need for the user to climb up on to the roof, and some even automating the movement.

Recreational vehicles and industrial/commercial vehicles are usually taller than conventional motor vehicles, so even the relatively short height of a retracted solar panel mount assembly may have clearance issues during travel under low bridges and the like. Furthermore, conventional motorized solar panel mounting mechanisms tilt or angle only along a single axis, and only halfway at that. Once the sun moved past the fullest extent of tilt, the vehicle would need to be re-oriented for the solar panel to track the sun for the rest of the day. More complex mounting assemblies would further increase the height over the roof of the vehicle. There is accordingly a need in the art for a low profile mounting assembly for solar panels to be protected during movement and being subject to high winds. There is also a need in the art for the mounting assembly to articulate the solar panel over a greater angular range.

BRIEF SUMMARY

The present disclosure contemplates an improved solar panel mount with adjustments that can be made from the comfort of the recreational vehicle/coach. The system can adjust the positioning/orientation of the solar panel in either direction between 0 and 45 degrees, and the best angle possible to directly face the sun can be set without being limited to preset angles. This is contemplated to maximize the energy that is harvested from the solar panel, without the need to make manual adjustments at the installation point that may be on the roof of a vehicle.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The detailed description set forth below in connection with the appended drawings is intended as a description of the several presently contemplated embodiments of a tilt-adjustable solar panel mounting system and is not intended to represent the only form in which such embodiments may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second, left and right, port-side and starboard side, distal and proximal, and so on are used solely to distinguish one from another entity without necessarily requiring or implying any actual such relationship or order between such entities.

Figure 1:
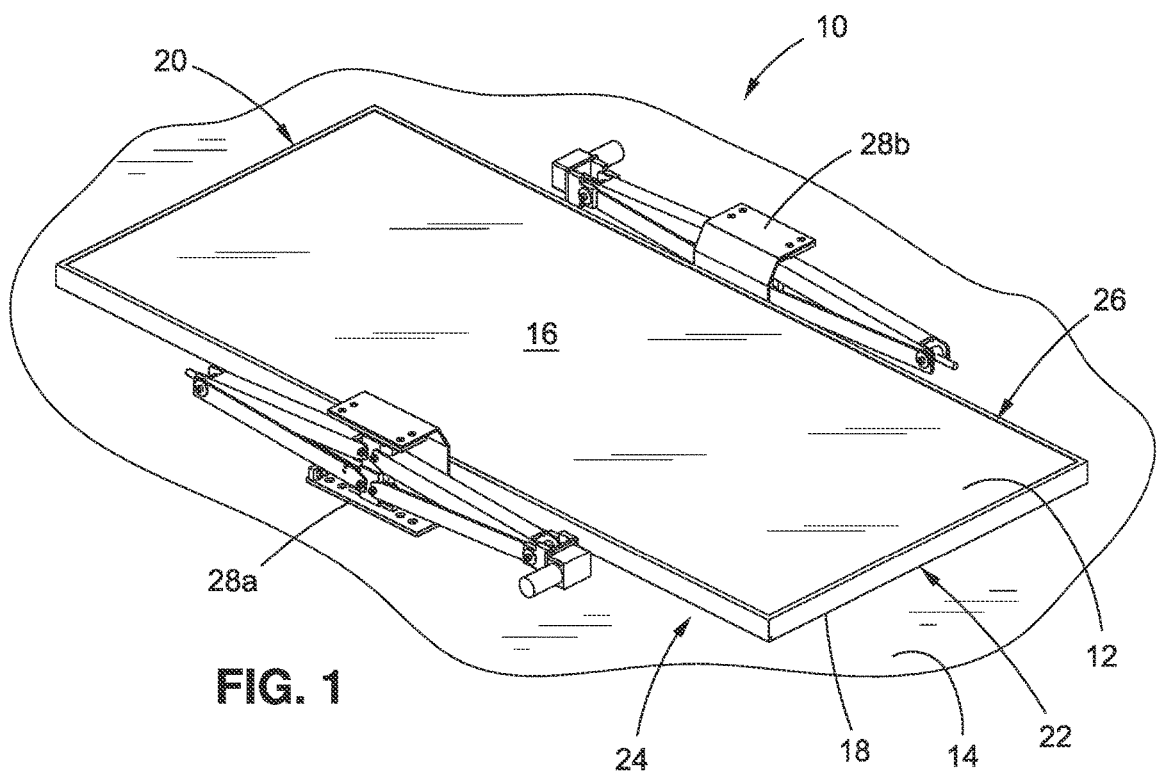
FIG. 1 is a perspective view of a tilt-adjustable solar panel mounting system in accordance with one embodiment of the present disclosure.

Referring to FIG. 1, various embodiments of the present disclosure include a tilt-adjustable solar panel mounting system 10 for attaching a solar panel 12 to a vehicle surface 14, which may preferably be the roof of a recreational vehicle. The system 10 need not be limited to recreational vehicle installations, however, and any other suitable installations, including on tractor trailers, other commercial vehicles, autonomous trailers, or even stationary solar panel installations are possible. The specifics of the installation application are therefore presented by way of example only and not of limitation. In the illustrated embodiment, the solar panel 12 has an elongate quadrangular shape, that is, rectangular. Accordingly, the solar panel 12 may be defined by a front face 16 with the open photovoltaic cells and an opposed rear face 18.

In most mounting configurations, the elongate axis of the solar panel 12 is aligned with the elongate axis of the vehicle, and so the solar panel 12 may have a front end or edge 20, and an opposed rear end or edge 22. Alternatively, the elongate axis of the solar panel 12 may be perpendicular to the elongate axis of the vehicle. Other configurations also contemplate multiple solar panels 12 with combined mounting orientations, e.g., one or more in a set of solar panels 12 being mounted parallel to the elongate axis of the vehicle, and one or more in a different set of solar panels 12 being mounted perpendicular to the elongate axis of the vehicle. Thus, capture of the solar rays is possible regardless of the orientation of the vehicle/coach to the sun.

Within the foregoing contextual references, the solar panel 12 may further be defined by a left side 24, along with an opposed right side 26. The left side 24 may be referred to as the port side and the right side 26 may be referred to as the starboard side consistent with vessel nomenclature. In many cases, the solar panel 12 is not mounted strictly at the center of the vehicle, as there may be other appliances such as an air conditioning unit that shares the roof space. The solar panel 12 may therefore be mounted on the port side or the starboard side, and as will be described in further detail below, the embodiments of the system 10 may tilt or rotate the solar panel 12 to face the port side or the starboard side while avoiding the obstructions posed by such additional appliances.

The tilt-adjustable solar panel mounting system 10 further includes two lift jacks 28, including a left or port side lift jack 28a, and a right or starboard side lift jack 28b. The port side lift jack 28a is coupled to the solar panel 12 at its left/port side 24, while the starboard side lift jack 28b is coupled to the solar panel 12 at its right/starboard side 26. In accordance with various embodiments of the present disclosure, the port side lift jack 28a and the starboard side lift jack 28b may be selectively extended and retracted to tilt or angle the solar panel 12 about its elongate axis. According to the illustrated embodiment, the lift jack 28 may be a scissor-type jack, where a pair of arms raise and lower a jacking head relative to a foot.

Figure 2:
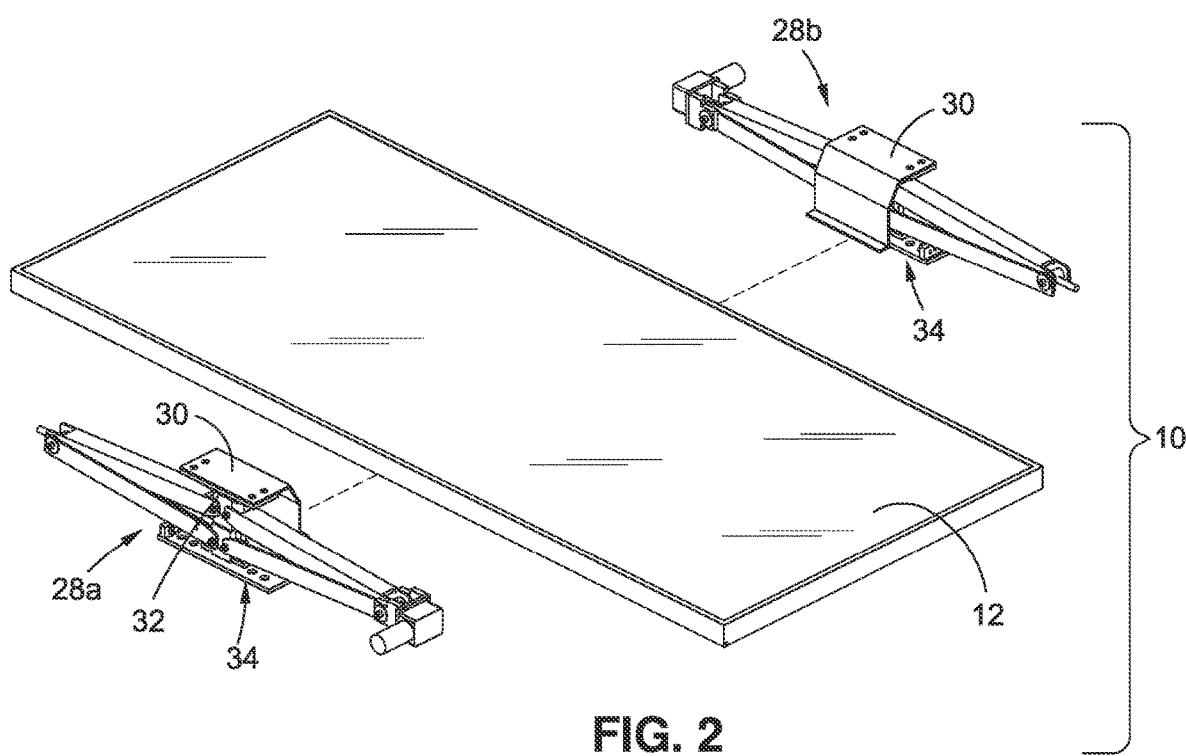
FIG. 2 is a partially exploded perspective view of the tilt-adjustable solar panel mounting system with the lift jacks separated from the solar panel.
Figure 3:
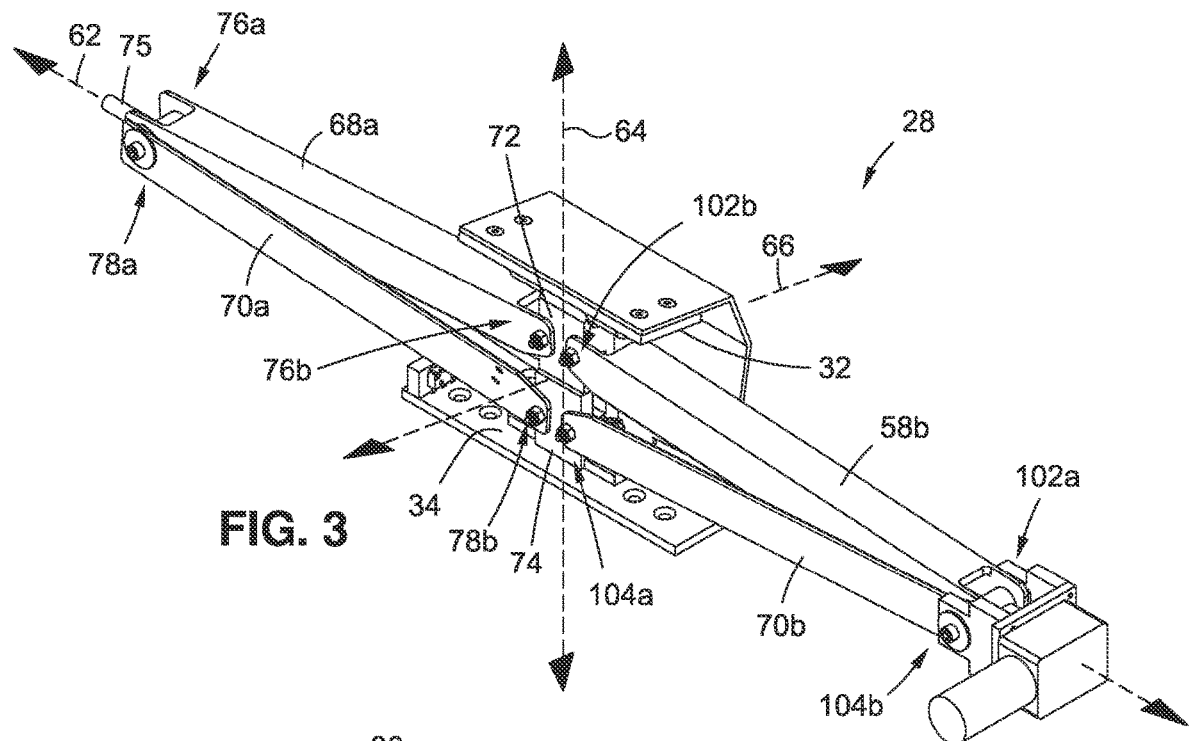
FIG. 3 is a perspective view of one embodiment of the lift jack utilized in the tilt-adjustable solar panel mounting system.
Figure 4:
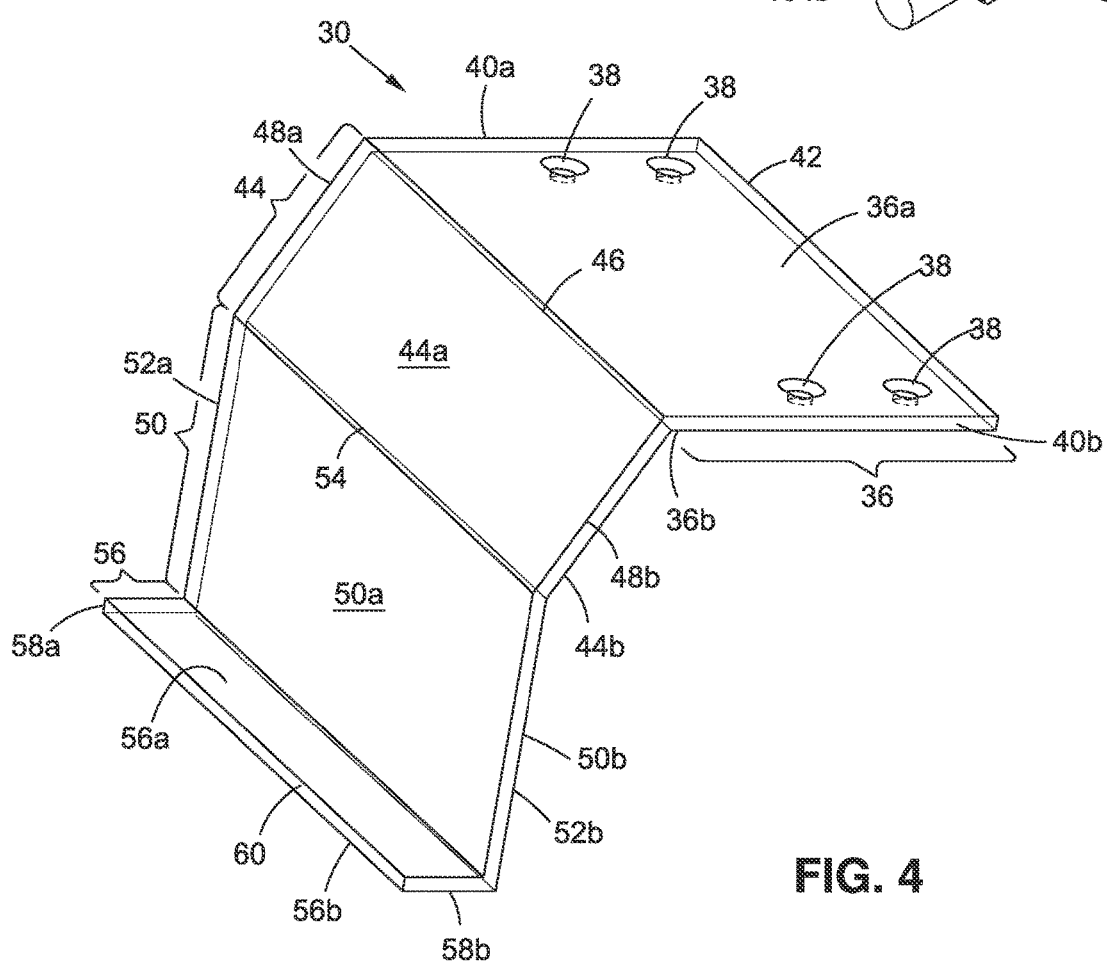
FIG. 4 is a perspective view of a mounting bracket utilized to mount the solar panel to the lift jack according to one embodiment of the present disclosure.

As shown in FIG. 2, the lift jacks 28 each include a bracket 30 attached thereto. With additional reference to FIG. 3, the lift jack 28 may be generally defined by a jacking head 32 and a foot 34 that is fastened to the vehicle surface 14. FIG. 4 best illustrates the features of the bracket 30, which in the example embodiment has a generally reverse-L shaped configuration with a top flat panel 36 defined by a top surface 36a and an opposite bottom surface 36b. The top flat panel 36 further defines a set of countersunk attachment holes 38 through which fasteners may be inserted to secure the bracket 30 to the lift jack 28. The top flat panel 36 has an elongate quadrangular shape, e.g., rectangular, with a left side edge 40a and a right side edge 40b, along with rear edge 42. Respective pairs of the countersunk attachment holes 38 are located at the opposed left side edge 40a and the right side edge 40b.

The bracket 30 is further defined by an angled panel 44 that laterally and vertically extend out from the top flat panel 36. In this regard, the angled panel 44 and the top flat panel 36 share a common front edge 46. The example embodiment contemplates an angular offset of approximately 60 degrees between the top flat panel 36 and the angled panel 44, though this is by way of example only and not of limitation. The angled panel 44 likewise has left and right side edges 48a, 48b that are contiguous with the left and right side edges 40a, 40b, respectively, of the top flat panel 36. Along these lines, the angled panel 44 is defined by a front face 44a and an opposite rear face 44b.

The bracket 30 is additionally defined by a vertical panel 50 that extends downwardly from the angled panel 44. The vertical panel 50 is understood to be perpendicular to the top flat panel 36, and is characterized by front face 50a and an opposite rear face 50b, along with a left side edge 52a and a right side edge 52b. The vertical panel 50 and the angled panel 44 share a common front edge 54.

Extending perpendicularly from the vertical panel 50 is a horizontal attachment flange 56 that defines a top surface 56a that abuts against or faces the solar panel 12. The horizontal attachment flange is understood to be parallel to the top flat panel 36. Being a contiguous structural part of the bracket 30, the horizontal attachment flange 56 may likewise be defined by left and right side edges 58a, 58b. The horizontal attachment flange 56 further defines an elongate front edge 60, along with a corner edge 58 common with the vertical panel 50. The bracket 30 is understood to position the solar panel 12 below the uppermost plane of the jacking head 32, minimizing the height profile of the overall assembly when the lift jacks 28 are fully retracted.

The combined height of the vertical panel 50 and the equivalent vertical height of the angled panel 44 define the depth of the solar panel 12 beneath the top plane of the jacking head 32. Assuming a flat vehicle surface 14, this depth is understood to be limited to the height of the jacking head 32 in its fully retracted state, with some additional clearance such that a bottom surface 56b does not contact or rest upon the vehicle surface 14. However, there may be alternative configurations of the vehicle surface 14 in which there may be a further recess around which the lift jacks 28 are mounted, allowing for further depth with respect to the bracket 30. The shape and dimensions of the bracket 30 are presented by way of example only and not of limitation, as any other suitable structure that achieves the same parameters may be substituted without departing from the scope of the present disclosure.

Figure 5:
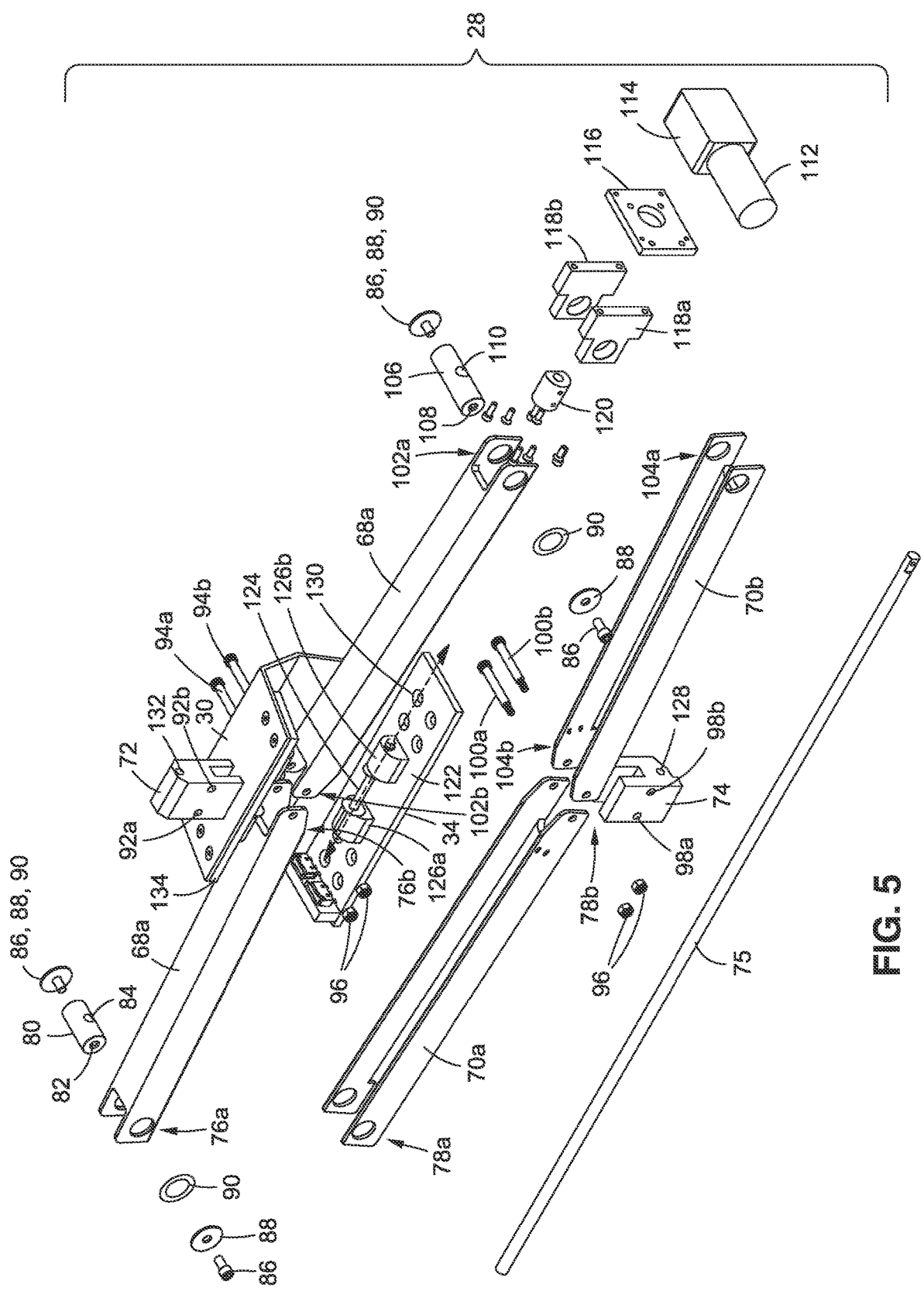
FIG. 5 is an exploded perspective view of the lift jack shown in FIG. 3.

The embodiments of the solar panel mounting system 10 further contemplate the lift jack 28 incorporating features in which the arms are capable of rotating about a pitch axis. With reference again to FIG. 3 and the exploded view of FIG. 5, the lift jack 28 may be generally defined by a lateral axis 62, a vertical axis 64, and a longitudinal axis 66. The features of the present lift jack 28 will be described in the context of this framework, and not those of the vehicle and the installation of the solar panel mounting system 10 relative thereto (e.g., port side, starboard side, front, aft, etc.) In accordance with conventional scissor-type jacks, the lift jack 28 has a pair of upper side arms 68, including an upper left arm 68a and an upper right arm 68b. Additionally, the lift jack 28 has a pair of lower side arms 70, including a lower left arm 70a and a lower right arm 70b.

The upper side arms 68 are both mounted to an upper pivot block 72, while the lower side arms 70 are mounted to a lower pivot block 74. The upper and lower side arms of each side are also rotatably coupled to each other, that is, the upper left arm 68a and the lower left arm 70a are rotatably coupled, and the upper right arm 68b and the lower right arm 70b are rotatably coupled. The upper pivot block 72 generally corresponds to the aforementioned jacking head 32, and the lower pivot block 74 generally corresponds to the foot 34, in that the distance between the upper pivot block 72/jacking head 32 and the lower pivot block 74/foot 34 can be selectively increased or decreased based upon the extent of articulation of the upper side arms 68 in relation to the lower side arms 70.

The extent of this articulation is understood to be adjustable by increasing or decreasing the span between the opposite ends of the left arms 68a, 70a and the right arms 68b, 70b. In this regard, there is understood to be a threaded lead shaft 75 extending between these two ends. As shown in the exploded view of FIG. 5, the upper left arm 68a includes an elbow yoke 76a on one end thereof, and an opposed jack yoke 76b. Likewise, the lower left arm 70a includes an elbow yoke 78a and an opposed jack yoke 78b. The holes of the respective elbow yokes 76a, 78a, are understood to be aligned with each other, and an arm bushing 80 is positioned therein. The arm bushing 80 has an elongate cylindrical configuration with a throughbore 82 extending therethrough. Furthermore, the arm bushing 80 defines a threaded crossbore 84. The arm bushing is retained within the holes of the elbow yokes 76a, 78a, with a cap fastener 86 secured within the throughbore 82 against a washer 88. Between the elbow yoke 76a of the upper left arm 68a and the elbow yoke 78a of the lower left arm 70a there may be a shim 90 that serves as a spacer to reduce friction between the harder metallic components that is the side arms 68, 70. On the opposite side, there may be the same assembly of the cap fastener 86 secured within the throughbore 82 against the washer 88. The throughbore 82 and the cap fasteners 86 may be threaded, though frictional retention without threading, or any other type of retention may be substituted. In this configuration, the upper left arm 68a and the lower left arm 70a rotate freely relative to each other.

The upper left arm 68a is also rotatably coupled to the upper pivot block 72. The holes defined on the jack yoke 76b is aligned with a left cross bore 92a defined therein, with a left shoulder fastener 94a being inserted through the jack yoke 76b and the left cross bore 92a of the upper pivot block 72. A fastener nut 96 is threaded or otherwise engaged with the left shoulder fastener 94 to secure it thereto. However, it is understood that the upper left arm 68a freely rotates about the upper pivot block 72 around the axis defined by the left cross bore 92a and the left shoulder fastener 94. The lower left arm 70a is similarly rotatably coupled to the lower pivot block 74, which defines a left cross bore 98a. A left shoulder fastener 100a is inserted through the jack yoke 78b and the left cross bore 98a of the lower pivot block 74, and another fastener nut 96 is threaded onto the left shoulder fastener 100a.

Like the upper left arm 68a and the lower left arm 70a, the upper right arm 68b and the lower right arm 70b are also rotatably coupled to the upper pivot block 72 and the lower pivot block 74, respectively. The upper right arm 68b incorporates an elbow yoke 102a and a jack yoke 102b opposite thereto, and the lower right arm 70b incorporates an elbow yoke 104a and a jack yoke 104b opposite thereto. With the upper right arm 68b, the holes defined on the jack yoke 102b is aligned with the left cross bore 92b on the upper pivot block 72, and a right shoulder fastener 94b is inserted therethrough. A fastener nut 96 is threaded on to the right shoulder fastener 94b to secure it thereto. The upper right arm 68b is understood to freely rotate about the right shoulder fastener 94b. In the lower right arm 70b, the holes defined in the jack yoke 104b is aligned with the left cross bore 98b on the lower pivot block 74, and a right shoulder fastener 100b is inserted therethrough. Still another fastener nut 96 is threaded onto to the right shoulder fastener 100 to secure it thereto.

The upper right arm 68b and the lower right arm 70b are rotatably coupled to each other at the respective elbow yokes 102a, 104a thereof. Again, the elbow yoke 102a and the elbow yoke 104 each define respective holes through which an arm bushing 106 is inserted. The upper right arm 68b and the lower right arm 70b thus rotate about the arm bushing 106, which has the same elongate cylindrical configuration including a throughbore 108 and a crossbore 110. The coupled relationship is maintained by the cap fastener 86 secured within the throughbore 108 against the washer 88. The shim 90 may be positioned between the elbow yoke 102a of the upper right arm 68b and the elbow yoke 104a of the lower right arm 70b. On the opposite side of the arm bushing 106, there may be the same assembly of the cap fastener 86 secured within the throughbore 82 against the washer 88.

Extending between the arm bushing 106 coupling the elbow yokes 102*a*, 104*a* of the right arms 68*b*, 70*b*, and the arm bushing 80 coupling the elbow yokes 76*a*, 78*a* of the left arms 68*a*, 70*a*, is the aforementioned threaded lead shaft 75 that allows for the span between the opposed left and right ends of the arms to be shortened or elongated. The shaft 75 is understood to be threaded through the crossbore 110 of the arm bushing 106, as well as the threaded crossbore 84 of the arm bushing 80. By rotating the shaft 75 into the arm bushings 80, 106, the distance between the two may be reduced, thereby increasing the distance between the upper pivot block 72 and the lower pivot block 74, or raising the upper pivot block 72 relative to the lower pivot block 74. The reverse action is understood to increase the distance between the arm bushings 80, 106 while decreasing the distance between the upper pivot block 72 and the lower pivot block 74.

The rotation movement of the shaft 75 may be provided by a motor 112, which may be an electrical motor that connected to an energy source and operated, e.g., rotated clockwise or counterclockwise, by a controller circuit. The motor 112 may be mounted to a gearbox 114, which in turn is attached to a motor mount plate 116. In addition to being inserted through the elbow yokes 102*a*, 104*a* of the right arms 68*b*, 70*b*, the arm bushing 106 is inserted through the holes of a pair of pivot shaft plates 118*a*, 118*b*. The motor mount plate 116 may be attached to the pivot shaft plates 118 with a set of fasteners 121. The rotational movement of the motor 112 is translated through the gearbox 114 to a drive coupler 120 fixed to the shaft 75. Thus, the drive coupler 120 rotates, and so does the shaft 75.

As indicated above, the embodiments of the present disclosure contemplate the lift jack 28 being configured to partially rotate the side arms 68, 70 about a pitch axis, that is, about the lateral axis 62. Specifically, the pivot blocks 72, 74 are rotatably mounted to the jacking head 32 and the foot 34, respectively. The exploded view of FIG. 6 best illustrates this mounting configuration of the lower pivot block 74 to the foot 34. In further detail, the foot 34 is generally defined by a foot plate 122 with a left pillow block 124*a* and a right pillow block 124*b* extending therefrom. A pivot shaft 126 extends through and between the left and right pillow blocks 124, as well as through a pivot bore 128 defined across the lower pivot block 74. This is understood to permit the lower pivot block 74 to rotate about a pivot axis 130 that is aligned with or parallel to the lateral axis 62. With the lower pivot block 74 being rotatable about the pivot axis 130, it follows that the lower left arm 70*a* and the lower right arm 70*b* are likewise rotatable about the pivot axis 130.

The same mechanism may be utilized in the upper pivot block 72, which similarly defines a pivot bore 132 through which a corresponding pivot shaft (not shown) can be inserted for rotational coupling. Thus, in the same way, the upper left arm 68*a* and the upper right arm 68*b* are rotatable about a pivot axis that is aligned with or parallel to the lateral axis 62. The upper pivot block 72 is therefore rotatably coupled to a jacking head plate 134, which in turn is attached to the underside of the bracket 30.

It is expressly contemplated that the lift jacks 28 and the bracket 30 are mounted on the exterior of a vehicle, and therefore exposed to moisture/rain, sun, and debris. Thus, the components of the solar panel mounting system 10 may be constructed of a durable, corrosion-resistant material. In accordance with one embodiment, this may be 6061 aluminum, with select components requiring additional flexibility being constructed of high performance Delrin®. This is by way of example only and not of limitation, however, and any other suitable material may be utilized. Regardless of the specific selection of material, that which is capable of ensuring that the solar panel mounting system 10 has a long service life despite harsh environmental conditions is contemplated.

Figure 6:
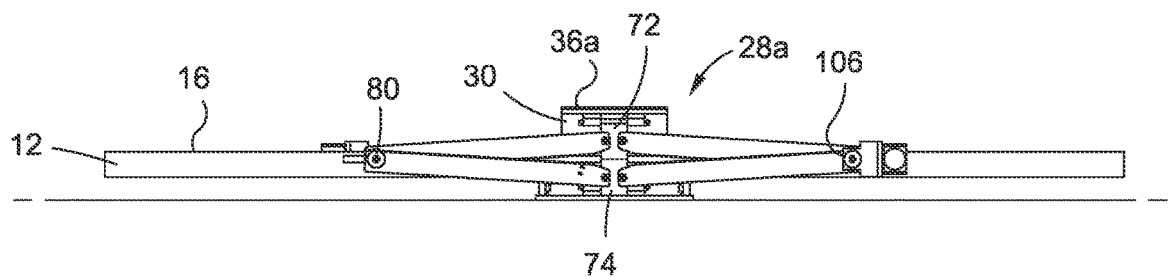
FIG. 6 is a bottom view of the tilt-adjustable solar panel mounting system fully retracted.
Figure 7:
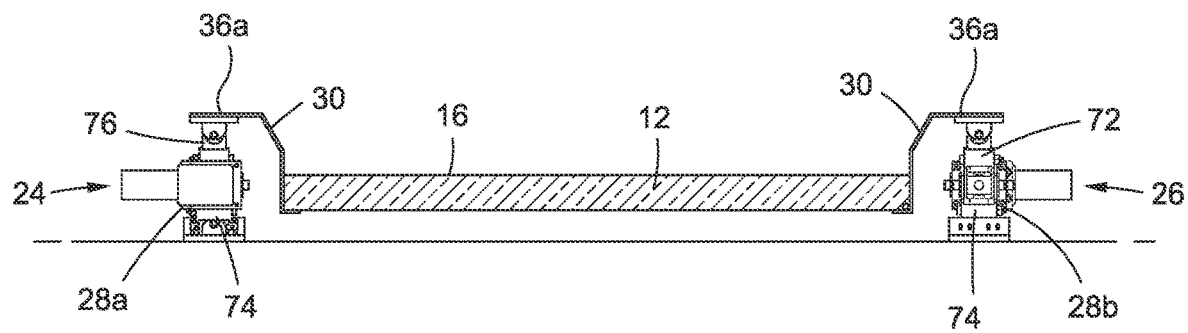
FIG. 7 is a side view of the tilt-adjustable solar panel mounting system fully retracted.

FIG. 6 shows the solar panel mounting system 10 as viewed from the left/port side 24 of the solar panel 12, and FIG. 7 shows the same as viewed from the front of the solar panel 12. The port side lift jack 28*a*, as well as the starboard side lift jack 28*b* is fully retracted, with the solar panel 12 being lowered to its minimal height. In the exemplary embodiment, the front face 16 of the solar panel 12 is below the top flat panel 36 of the bracket 30. The distance between the upper pivot block 72 and the lower pivot block 74 is at a minimum, while the span between the arm bushing 80 and the arm bushing 106 are at a maximum.

Either one of the port side lift jack 28*a* or the starboard side lift jack 28*b* may be extended to raise the corresponding port side 24 or starboard side 26 of the solar panel 12, thereby tilting the front face 16 in a desired orientation. FIGS. 8 through 11 depict the solar panel being tilted to various angle as the starboard side 26 of the solar panel is raised to various heights. The movement of the upper side arms 68 and the lower side arms 70 is not limited to strictly a vertical or up-and-down movement and can rotate relative to the foot 34 as well as the jacking head 32 because of the aforementioned upper pivot block 72 and the lower pivot block 74. In order to achieve the illustrated orientation of the solar panel 12, the port side lift jack 28*a* need not be actuated, but the upper pivot block 72 thereof is permitted to freely rotate to the tilted position as shown.

Figure 8:
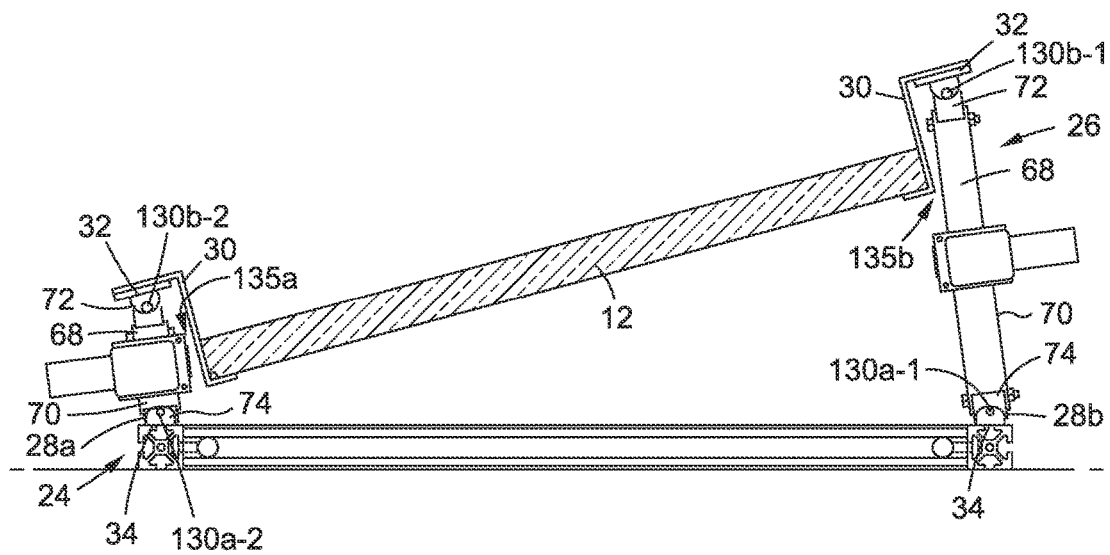
FIG. 8 is a side view of the tilt-adjustable solar panel mounting system with the solar panel tilted approximately fifteen degrees.

With specific reference to FIG. 8, the solar panel 12 is show as being tilted toward the port side 24 by raising the starboard side lift jack 28*b*. At the illustration position, the solar panel 12 is understood to be titled approximately fifteen degrees. The starboard side lift jack 28*b* is raised/extended, with the lower pivot block 74 (and hence the side arms 68, 70) being rotated about a lower pivot axis 130*a*-1 toward the port side 24 relative to the foot 34. Additionally, the jacking head 32 of the starboard side lift jack 28*b* rotates about an upper pivot axis 130*b*-1 relative to the upper pivot block 72.

The port side lift jack 28*a* is not raised or extended, but nevertheless rotates to raise the bracket 30 in conjunction with the raising of the opposite bracket 30 on the starboard side lift jack 28*b* to which it is coupled. In particular, the jacking head 32, and hence the bracket 32 of the port slide lift jack 28*b*, rotates about the upper pivot block 72 along an upper pivot axis 130*b*-2. Likewise, the lower pivot block 74 rotates about a lower pivot axis 130*a*-2 relative to the foot 34. With the pivoting attachment between the jacking heads 32 and the upper side arms 68, and the foot 34 and the lower side arms 70, it is understood that the spacing between the brackets 30 and the respective starboard and port side lift jacks 28 are maintained to be an equal distance. That is, the spacing 135*a* between the port side lift jack 28*a* and the bracket 30 thereof is the same the spacing 135*b* between the starboard side lift jack 28*b* and the bracket 30 thereof.

Figure 9:
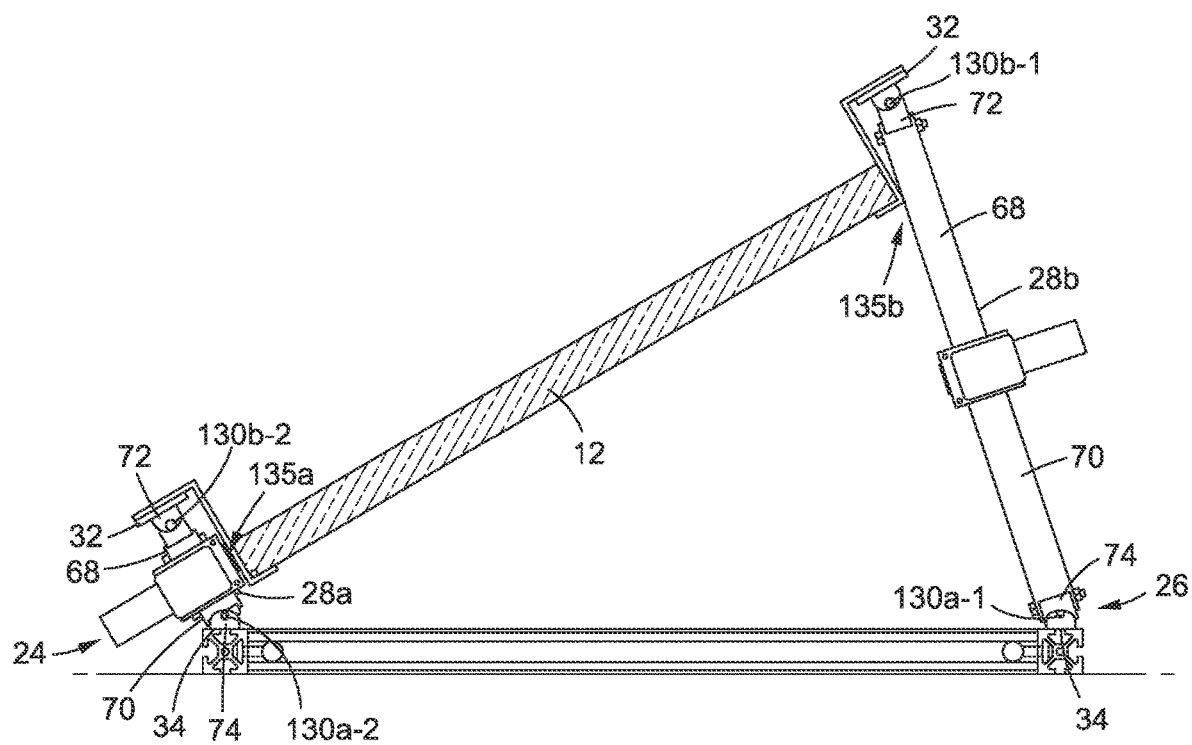
FIG. 9 is a side view of the tilt-adjustable solar panel mounting system with the solar panel tilted approximately thirty degrees.

FIG. 9 illustrates the solar panel 12 being tilted approximately thirty degrees. The starboard side lift jack 28*b* is further raised/extended, with the lower pivot block 74 being rotated about the lower pivot axis 130*a*-1 further toward the port side 24 relative to the foot 34. The jacking head 32 of the starboard side lift jack 28*b* remains in a similar pivot orientation. The port side lift jack 28*a* remains un-extended while the side arms 68, 70 continues its respective articulations. The jacking head 32 remains in a similar pivot orientation as before, but the lower pivot block 74 rotates further about the lower pivot axis 130a-2 relative to the foot 34. The spacing between the brackets 30 and the respective starboard and port side lift jacks 28 continue to be maintained at an equal distance. The spacing 135a between the port side lift jack 28a and the bracket 30 thereof is the same as the spacing 135b between the starboard side lift jack 28b and the bracket 30 thereof.

Figure 10:
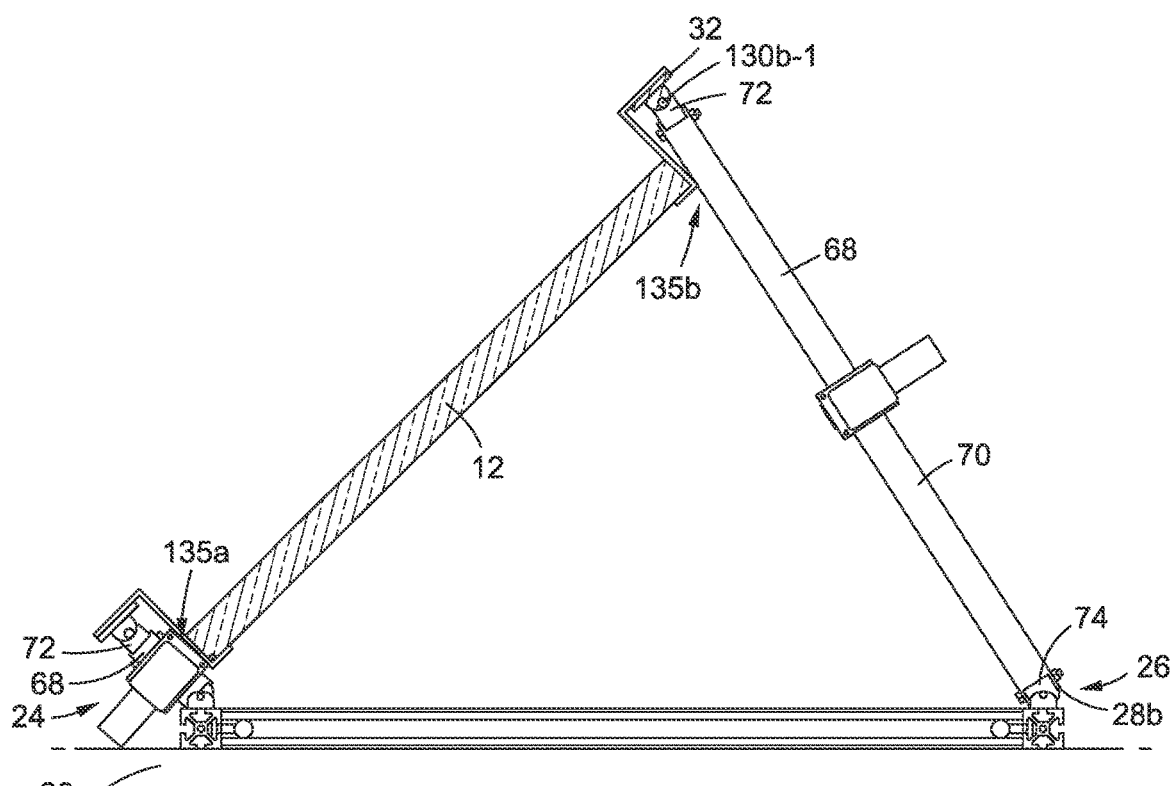
FIG. 10 is a side view of the tilt-adjustable solar panel mounting system with the solar panel tilted approximately forty five degrees.
Figure 11:
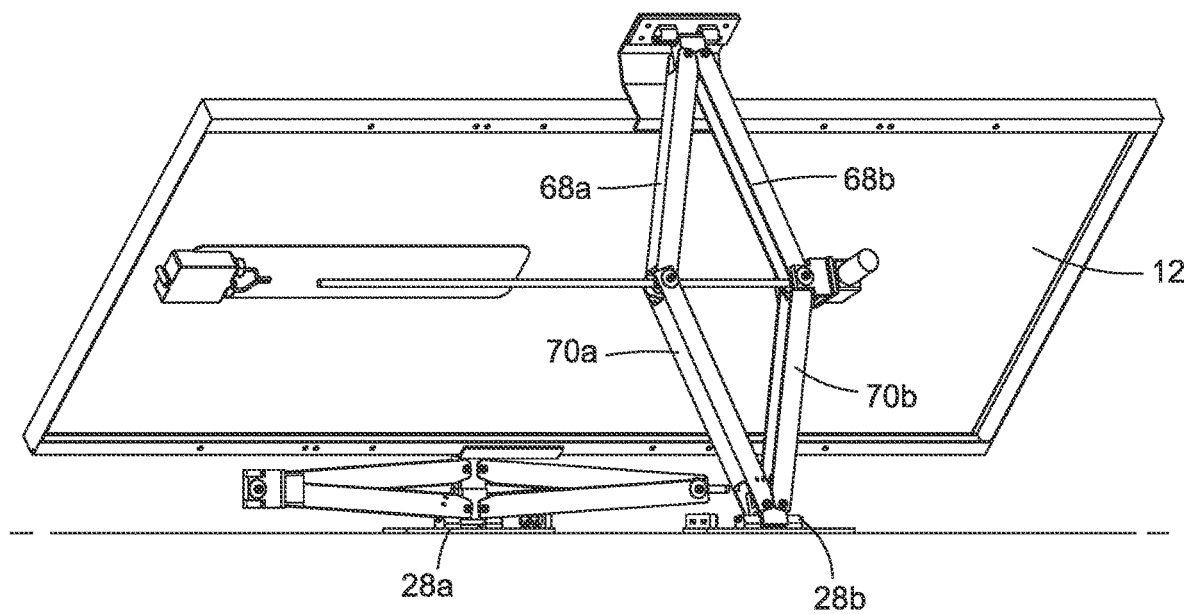
FIG. 11 is a bottom perspective view of the tilt-adjustable solar panel mounting system with the first lift jack extended and the second lift jack extended.

FIG. 10 and FIG. 11 show the solar panel 12 being tilted approximately forty five degrees. The starboard side lift jack 28b is extended to its limit, and the lower pivot block 74 is rotated about the lower pivot axis 130a-2 further toward the port side relative to the foot 34. The jacking head 32 remains in the same pivot orientation. The port side lift jack 28a remains un-extended while the side arms 68, 70 continues its respective articulations. The jacking head 32 remains in a similar pivot orientation as before, but the lower pivot block 74 rotates further about the lower pivot axis 130a-2 relative to the foot 34. The spacing between the brackets 30 and the respective starboard and port side lift jacks 28 continue to be maintained at an equal distance. The spacing 135a between the port side lift jack 28a and the bracket 30 thereof is the same as the spacing 135b between the starboard side lift jack 28b and the bracket 30 thereof.

Figure 12:
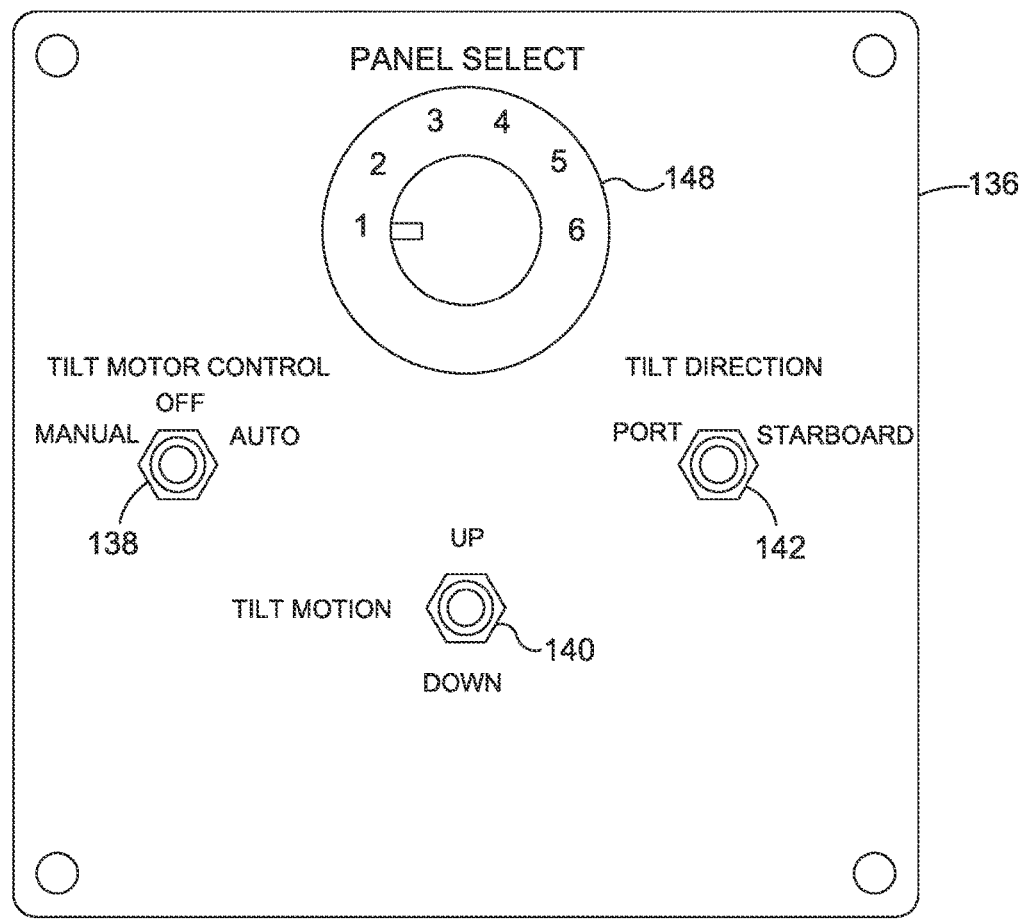
FIG. 12 is an example switch controller that may be used to operate the tilt-adjustable solar panel mounting system.

The port side lift jack 28a and the starboard side lift jack 28b may be independently actuated to set a desired tilt angle of the solar panel 12. In most cases, however, only one lift jack 28 or the other need be extended to set a tilt angle that maximizes the reception of the solar rays. Thus, the operation, and hence the control of a solar panel mounting system 10 with a single solar panel 12 may be simplified to setting either a port direction or a starboard direction. With reference to FIG. 12, there may be a switch controller 136 with three multi-position electrical switches, including a tilt motor control switch 138, a tilt motion switch 140, and a tilt direction switch 142.

Figure 13:
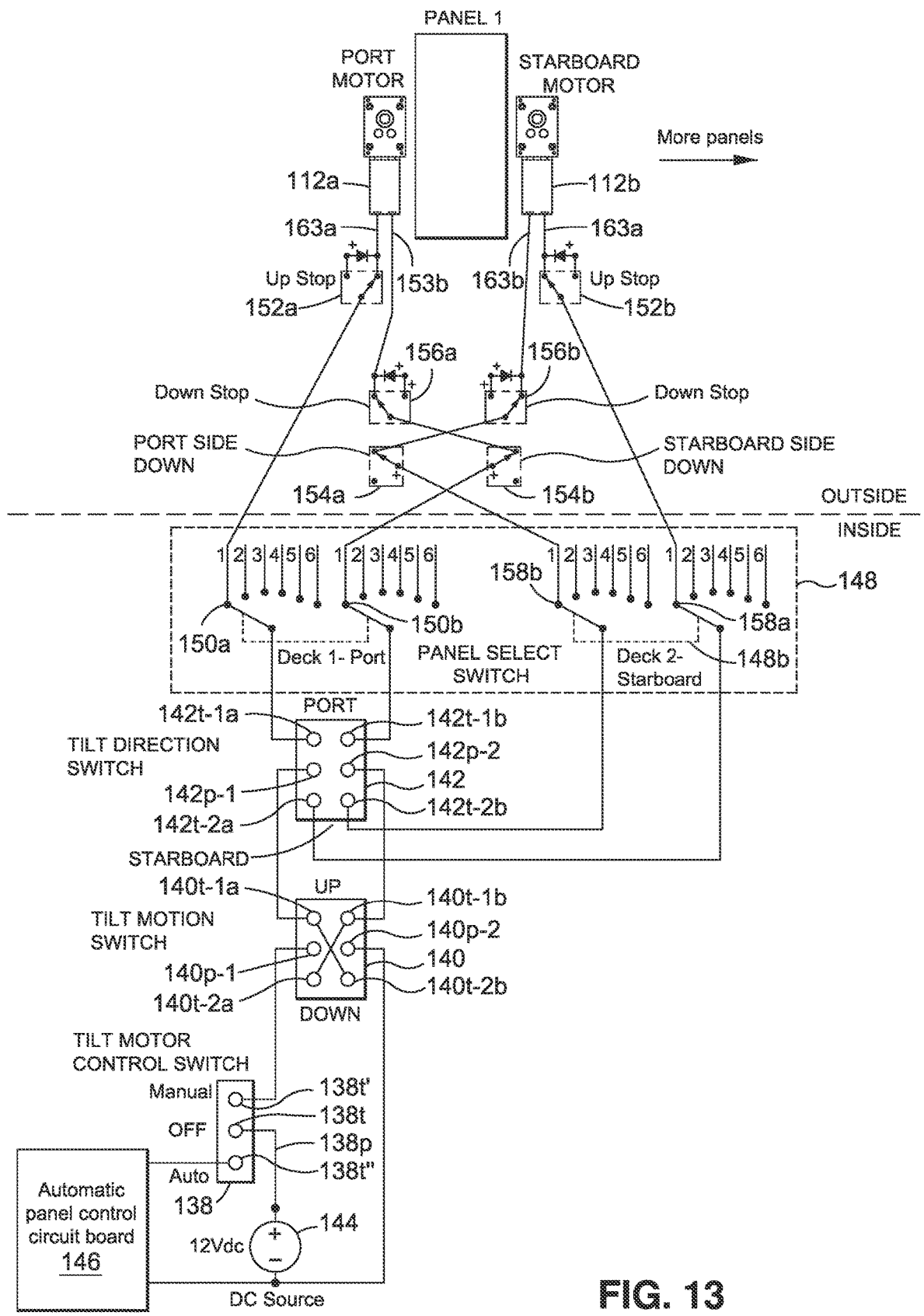
FIG. 13 is a circuit diagram of the switch controller according to one embodiment of the present disclosure.

As shown in the circuit diagram of FIG. 13, the tilt motor control switch 138 is a single pole, triple throw switch including a pole terminal 138p that is connectable either to ground (off) at a throw 138t, a manual control circuit throw 138t', or an automatic control circuit throw 138t". The pole terminal 138p is connected to the positive terminal of a DC voltage source 144, which according to one embodiment of the disclosure, has an output voltage of 24 volts. The tilt motor control switch 138 is understood to be a continuous contact switch, that is, once the pole is connected to a throw terminal, it remains connected thereto until the switch is set to a different position. When the pole terminal 138p is connected to the manual control circuit throw 138t', the DC voltage source 144 is connected to the tilt motion switch 140. Alternatively, when the pole terminal 138p is connected to the automatic control circuit throw 138t", the DC voltage source 144 is connected to an automatic control circuit 146.

In one embodiment, the automatic control circuit 146 detects the amount of energy captured by the solar panel 12, and continuously adjusts the tilt angle thereof to achieve a maximum panel output. The sampling rate of the energy capture amount may be every 5 minutes, or any other suitable time interval. It is expressly contemplated that the automatic control circuit 146 is a "set and forget" system that is activated whenever the tilt motor control switch 138 is set to "auto," and the solar panel 12 is not docked.

The tilt motion switch 140 is understood to be a momentary contact, dual pole, dual throw switch with a first pole terminal 140p-1 connected to the manual control circuit throw 138t' of the tilt motor control switch 138, and a second pole terminal 140p-2 connected to ground. By actuating the switch to the 'up' position, the first pole terminal 140p-1 is connected to a first throw first terminal 140t-1a, and the second pole terminal 140p-2 is connected to a first throw second terminal 140t-1b. By actuating the switch to the 'down' position, the first pole terminal 140p-1 is connected to a second throw first terminal 140t-2a, and the second pole terminal 140p-2 is connected to a second throw second terminal 140t-2b. In general, the pair of positive DC/ground connections to the upstream switch is reversed when actuating the motor 112 in the reverse direction, so there is a crossover that reverses the connection of the first pole terminal 140p-1 and the second pole terminal 140p-2. That is, the second throw first terminal 140t-2a is connected to the first throw second terminal 140t-1b, and the second throw second terminal 140t-2b is connected to the first throw first terminal 140t-1a. The first throw first terminal 140t-1a and the second throw second terminal 140t-1b are always connected to the upstream tilt direction switch 142.

The tilt direction switch 142 is understood to be a dual pole, dual throw switch with a first pole terminal 142p-1 that is connected to the first throw first terminal 140t-1a, and a second pole terminal 142p-2 that is connected to the first throw second terminal 140t-1b. By setting the switch to the 'port' position, the first pole terminal 142p-1 is connected to a first throw first terminal 142t-1a, and the second pole terminal 142p-2 is connected to a first throw second terminal 142t-1b. By setting the switch to the 'starboard' position, the first pole terminal 142p-1 is connected to a second throw first terminal 142t-2a, and the second pole terminal 142p-2 is connected to a second throw second terminal 142t-2b.

The switch controller 136 may be configured to operate up to six separate solar panels 12, each with its own port and starboard lift jacks 28b and consequent motors 112 thereof. To this end, the switch controller 136 includes a panel select rotary switch 148 with six positions. The limit of six panels is by way of example only and not of limitation, and different embodiments may be configured for fewer or more solar panels. In such alternative embodiments, the total number of switch positions in the panel select rotary switch 148 is understood to be the same as the total number of solar panels 12 that can be controlled with the single switch controller 136.

As specifically shown in the circuit diagram of FIG. 13, the panel select rotary switch 148 is a dual-pole, six throw switch with a first deck 148a for connecting to the motors 112 coupled to the port side lift jacks 28a, and a second deck 148b for connecting to the motor 112 coupled to the starboard side lift jacks 28b. The first throw terminal 150a of the first deck 148a is connected to a positive or forward direction terminal 153a of a motor control circuit of a port-side motor 112a. There may additionally be a up direction stop switch 152a that stops the port-side motor 112a upon sensing a limit position therefor. This may be an optical sensor or other proximity sensor that detects the maximum extended position of one of the side arms 68, 70 of the port side lift jack 28a, or any other suitable moving component thereof.

The second throw terminal 150b is connected to the negative or reverse direction terminal 153b of the motor control circuit of the port-side motor 112a. Interposed between the second throw terminal 150b and the reverse direction terminal 153b may be a starboard side down switch 154b that confirms that the starboard side lift jack 28b is fully retracted before the port-side motor 112a is permitted to actuate. Furthermore, there may be a down direction stop switch 156a that stops the port-side motor 112a upon sensing a limit position therefor.

The first throw terminal 158a of the second deck 148b is connected to a positive or forward direction terminal 163a of a motor control circuit of a starboard-side motor 112b. There may additionally be a up direction stop switch 152b that stops the starboard-side motor 112b upon sensing a limit position therefor.

The second throw terminal 158b is connected to the negative or reverse direction terminal 163b of the motor control circuit of the starboard-side motor 112b. Interposed between the second throw terminal 158b and the reverse direction terminal 163b may be a port-side down switch 154a that confirms that the port side lift jack 28a is fully retracted before the starboard-side motor 112b is permitted to actuate. There may also be a down direction stop switch 156b that stops the starboard-side motor 112b upon sensing a limit position therefor.

In order to operate the solar panel mounting system 10, the tilt motor control switch 138 is first set to the 'off' position. The desired solar panel is then selected with the panel select rotary switch 148. Them the tilt direction switch 142 is set to either the 'port' or 'starboard' position. The selected port side lift jack 28a, or the starboard side lift jack 28b is then actuated by momentarily moving the tilt motion switch 140 to either the 'up' position or the 'down' position, based upon a visual confirmation of the incoming voltage and/or current from the solar panel 12.

Figure 14:
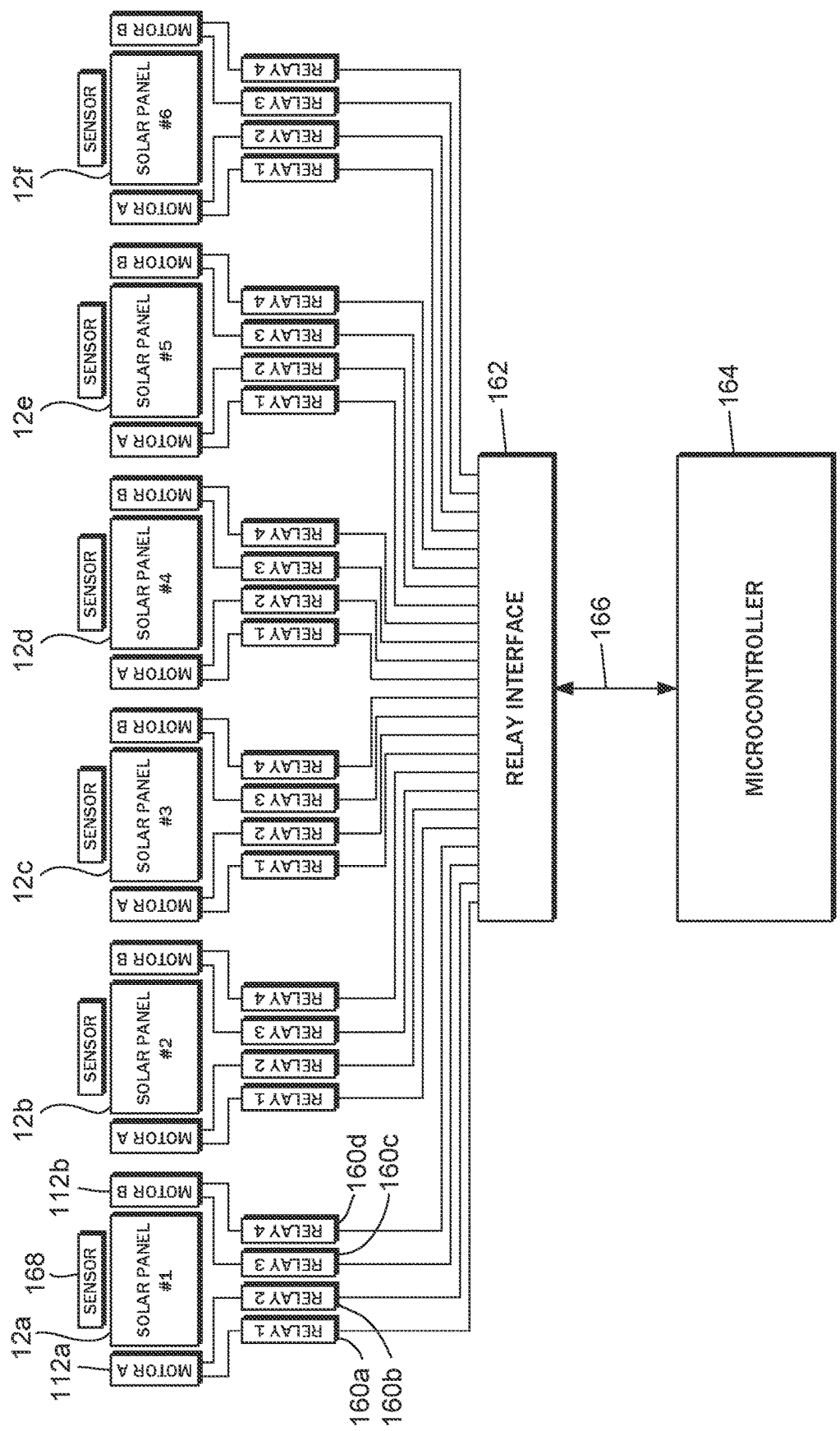
FIG. 14 is a block diagram of the tilt-adjustable solar panel mounting system including the components for operating an installation with six solar panels.

Another embodiment of the present disclosure contemplates an automated system of controlling a plurality of solar panels 12. Specifically, with reference to the block diagram of FIG. 14, up to six (6) may be remotely controlled, including a first solar panel 12a, a second solar panel 12b, a third solar panel 12c, a fourth solar panel 12d, a fifth solar panel 12e, and a sixth solar panel 12f. As discussed above, each solar panel has a first motor 112a for the port side lift jack 28a, and a second motor 112b for the starboard side lift jack 28b. The first motor 112a is actuated by a first relay 160a in the first direction, as well as by a second relay 160b in the second direction. Likewise, the second motor 112b is actuated by a third relay 160c in the first direction, and a fourth delay 160d in the second direction. These relays 160 are connected to a relay interface 162. The commands to output to each of the relays 160 are provided by a microcontroller 164, which includes a general-purpose data processor, memory, and input/output ports. Between the relay interface 162 and the microcontroller 164 may be a communications channel 166. According to one embodiment, the communications channel 166 may be a wired link, though wireless links such as WiFi, Bluetooth, Zigbee and the like may be utilized. In this regard, the microcontroller 164 may be remote or physically separated from the relay interface 162, which may be disposed closer to the solar panels 12.

Inputs to the microcontroller 164 via switches and the like may independently actuate the relays 160, not unlike the switches in the aforementioned switch controller 136. There may also be a graphical user interface that abstracts the specific movement of the panel, and instead allow the user to enter numeric angle values that are translated to the electrical signals actuating the relays 160 and the motors 112. Still further, as briefly mentioned above, the microcontroller 164 may automatically adjust the tilt angles of each of the solar panels 12 to maximize power generation. Each solar panel 12 may include a power sensor 168 that reports the total power generated thereby. The microcontroller may record the data reported by the power sensor 168 as the solar panel 12 is rotated from minimum extension to maximum extension, selecting as the final position that tilt angle that resulted in the maximum power generated. Once the execution of the automated system is underway, further adjustments as time passes may be made by smaller sweeps of the title angle to ascertain the maximum power generated. The foregoing is one possible method for automatically positioning the solar panel 12, and others may be substituted.

The particulars shown herein are by way of example and for purposes of illustrative discussion of the embodiments of the tilt-adjustable solar panel mounting system and are presented in the cause of providing what is believed to be the most useful and readily understood description of the principles and conceptual aspects. In this regard, no attempt is made to show details with more particularity than is necessary, the description taken with the drawings making apparent to those skilled in the art how the several forms of the present disclosure may be embodied in practice.

What is claimed is:

1. A tilt adjustment system for a solar panel mountable to a vehicle surface, comprising:
   a first panel bracket defined by an upper flat section and a lower flat section with the solar panel being mounted thereto;
   a first lift jack with a jacking head mounted to the upper flat section of the first panel bracket and a foot mountable to the vehicle surface, an upper face of the solar panel being positioned below a plane of the upper flat section of the first panel bracket;
   a second panel bracket defined by an upper flat section and a lower flat section with the solar panel being mounted thereto; and
   a second lift jack with a jacking head mounted to the upper flat section of the second panel bracket and a foot mountable to the vehicle surface, the upper face of the solar panel being positioned below a plane of the upper flat section of the second panel bracket.

2. The system of claim 1, further comprising:
   a first motor coupled to the first lift jack;
   a second motor coupled to the second lift jack; and
   a remote controller connected to the first motor and the second motor to selectively and independently raise and lower the first lift jack and the second lift jack.

3. The system of claim 1, wherein the first panel bracket and the second panel bracket each define vertical sections between the respective upper flat sections and the lower flat sections.

4. The system of claim 1, wherein the first lift jack and the second lift jack are scissor-type jacks.

5. The system of claim 4, wherein the first lift jack and the second lift jack each include a pair of upper side arms and a pair of lower side arms.

6. The system of claim 5, wherein:
   the first lift jack includes a first lift jack upper pivot block to which the upper side arms of the first lift jack are mounted and a first lift jack lower pivot block to which the lower side arms of the first lift jack are mounted;
   the second lift jack includes a second lift jack upper pivot block to which the second lift jack upper side arms are mounted, and a second lift jack lower pivot block to which the second lift jack lower side arms are mounted.

7. The system of claim 6, wherein:
   the upper side arms of the first lift jack are rotatably coupled to a corresponding one of the lower side arms; and
   the upper side arms of the second lift jack are rotatably coupled to a corresponding one of the lower side arms.

8. The system of claim 7, wherein each of the first lift jack and the second lift jack includes a rotating shaft extending between opposite ends of rotatably coupled pairs of the upper and lower side arms of the corresponding one of the first lift jack and the second lift jack.

9. The system of claim 6, wherein:
the upper pivot block of the first lift jack is rotatably coupled to the jacking head thereof and the upper pivot block of the second lift jack is rotatably coupled to the jacking head thereof; and
the lower pivot block of the first lift jack is rotatably coupled to the foot thereof and the lower pivot block of the second lift jack is rotatably coupled to the foot thereof.

* * * * *